United States Patent
McGregor

(10) Patent No.: US 7,097,302 B2
(45) Date of Patent: Aug. 29, 2006

(54) RIGID GAS PERMEABLE CONTACT LENS WITH 3-PART CURVATURE

(76) Inventor: Scott D. McGregor, 2802 Straffordshire Dr., Carrollton, TX (US) 75007

( * ) Notice: Subject to any disclaimer, the term of this patent is extended or adjusted under 35 U.S.C. 154(b) by 0 days.

(21) Appl. No.: 11/017,612

(22) Filed: Dec. 20, 2004

(65) Prior Publication Data
US 2006/0001829 A1 Jan. 5, 2006

Related U.S. Application Data

(60) Provisional application No. 60/585,266, filed on Jul. 3, 2004.

(51) Int. Cl.
G02C 7/04 (2006.01)

(52) U.S. Cl. .............................. 351/160 R; 351/160 H
(58) Field of Classification Search ............. 351/160 R
See application file for complete search history.

(56) References Cited

U.S. PATENT DOCUMENTS

| | | | |
|---|---|---|---|
| 4,525,043 A * | 6/1985 | Bronstein | 351/160 R |
| 5,002,382 A | 3/1991 | Seidner | |
| 5,181,053 A * | 1/1993 | Brown | 351/161 |
| 5,493,350 A | 2/1996 | Seidner | |
| 5,835,187 A | 11/1998 | Martin | |
| 5,847,802 A * | 12/1998 | Menezes et al. | 351/161 |
| 6,010,219 A * | 1/2000 | Stoyan | 351/160 R |
| 6,244,709 B1 | 6/2001 | Vayntraub et al. | |
| 6,457,826 B1 * | 10/2002 | Lett | 351/161 |
| 6,652,095 B1 * | 11/2003 | Tung | 351/161 |
| 6,659,607 B1 | 12/2003 | Miyamura et al. | |
| 7,004,584 B1 * | 2/2006 | Meyers et al. | 351/160 R |
| 2002/0021410 A1 | 2/2002 | Ye | |
| 2002/0060776 A1 | 5/2002 | Hodur et al. | |
| 2002/0159025 A1 | 10/2002 | Legerton et al. | |
| 2002/0186345 A1 | 12/2002 | Duppstadt | |
| 2003/0043342 A1 | 3/2003 | Seidner | |

FOREIGN PATENT DOCUMENTS

CH 680954 A5 * 12/1992

OTHER PUBLICATIONS

George E. Garcia, M.D.; "Contact Lens Fitting in Keratoconus and Following Keratoplasty": Corneal Disorders, Clinical Diagnosis and Management: 1984; p. 682; W.B. Saunders Company: Philadelphia, PA, USA.

* cited by examiner

*Primary Examiner*—Jordan M. Schwartz
(74) *Attorney, Agent, or Firm*—Howsion & Arnott, L.L.P.

(57) ABSTRACT

A contact lens for wearing on a patient's eye comprises an anterior surface adapted to face away from the eye and a posterior surface adapted to face toward the eye. The posterior surface has an optical zone disposed in the center of the lens, a secondary zone coupled to the optical zone and extending radially therefrom, and a peripheral zone coupled to the secondary zone and extending radially therefrom. The curve of the optical zone is spherical and rearwardly concave, the curve of the secondary zone is aspheric and rearwardly concave, and the curve of the peripheral zone is spherical and rearwardly concave.

16 Claims, 3 Drawing Sheets

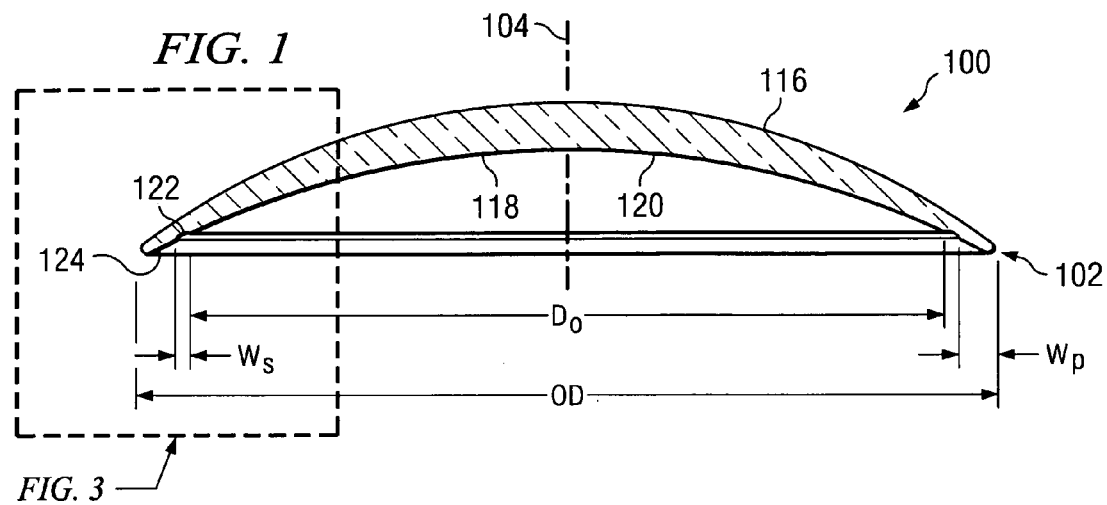
*FIG. 1*
*FIG. 3*
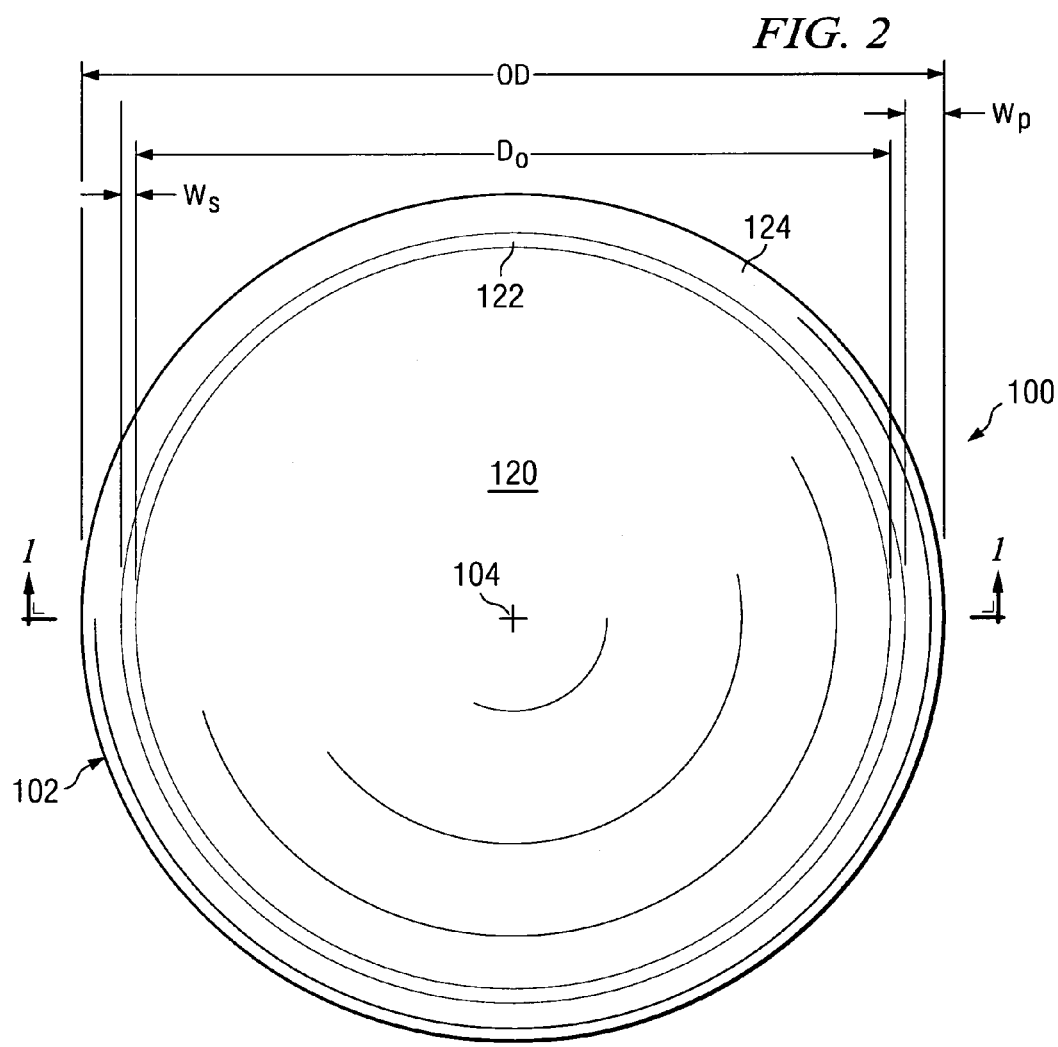
*FIG. 2*

RIGID GAS PERMEABLE CONTACT LENS WITH 3-PART CURVATURE

CROSS REFERENCE TO RELATED APPLICATIONS

This application claims the benefit of U.S. Provisional Application No. 60/585,266, filed Jul. 3, 2004, titled "CONTACT LENS WITH 3-PART CURVATURE."

TECHNICAL FIELD OF THE INVENTION

The current invention relates generally to the field of contact lenses, and more specifically to rigid gas permeable (RGP) contact lenses. In particular, it relates to rigid gas permeable contact lenses having three-part curvature on the posterior side of the lens. Such contact lenses are particularly well suited for use in the post-operative care of cornea transplant and cornea trauma patients.

BACKGROUND OF THE INVENTION

Following surgical procedures performed on the cornea of the eye, e.g., cornea transplants, LASIK (laser-assisted in-situ keratomileusis), RK (radial keratotomy) or other refractive correction procedures, it is sometimes necessary for the post-operative patient to be fitted with rigid gas permeable ("RGP") contact lenses to provide satisfactory vision, or to address other medical concerns. Unfortunately, RGP contact lenses often rest on the same area of the eye in which the post-operative sutures or scar tissue are present. Since the sutures or scar tissue may be very sensitive to touch, it can be very difficult to fit post-operative patients with conventional RGP contact lenses that do not irritate the traumatized tissue. In some cases, practitioners must re-fit the post-operative patient dozens of times before satisfactory lenses are found. In other cases, no satisfactory lens can be found, and the patient's vision needs remain unmet. A need therefore exists, for a contact lens that is relatively comfortable when worn over sutures or scar tissue in the eye of a post-operative patient.

For example, it has become standard practice for donor corneas intended for use in cornea transplants to be harvested in the form of uniformly sized, circular-shaped pieces approximately 8 mm in diameter, known as "buttons." During the transplant procedure, a corresponding 8 mm circle is incised from the center of the patient's damaged cornea. The donor cornea "button" is then inlayed into the incised area and stitched around its periphery onto the remaining portion of the old cornea. Thus, the typical cornea transplant patient has a traumatized "surgical junction" area on their post-transplant eye(s) that is disposed in a generally circular pattern having a median diameter of about 8 mm. This surgical junction area is extremely sensitive to touch for some time after surgery, and may remain sensitive in some patients for an indefinite period. Unfortunately, most conventional RGP contact lenses have abrupt curvature junctions or other discontinuities in the annular region of approximately 8 mm in diameter, frequently making them uncomfortable for use by post-transplant patients. A need therefore further exists, for a RGP contact lens that has no abrupt curvature junctions or discontinuities in the annular region around 8 mm in diameter.

It is known that severe corneal astigmatism is frequently encountered in post-cornea transplant cases. Severe corneal astigmatism can also result from non-transplant causes such as disease, aging and hereditary factors. Regardless of the astigmatism's cause, the conventional literature teaches that using RGP contact lenses to successfully correct severe corneal astigmatism, i.e., where "severe" is usually characterized as corneal astigmatism in excess of 2.0 diopters (although sometimes characterized as corneal astigmatism in excess of 3.0 diopters), requires the use of so-called "bi-toric" lens prescriptions. Unlike standard lenses, which have a curvature prescription that is radially uniform (i.e., the same in all radial planes), bi-toric lenses have two different curvatures prescriptions, typically specified for roughly perpendicular radial planes. Although most practitioners can easily do the calculations required to fit a patient with a standard (i.e., radially uniform curvature) prescription, many practitioners find the calculations required to fit a patient with a bi-toric prescription to be prohibitively complex. In addition to being difficult to prescribe, bi-toric lenses are difficult to manufacture, resulting in a materially higher cost than standard lenses. This problem is further exacerbated if the practitioner must multiple fittings are required on the patient. A need therefore exists, for a RGP contact lens having a simple radially symmetrical curvature that can be used to treat severe corneal astigmatism in excess of 3.0 diopters.

It is further known that the precision of the refractive correction achievable using conventional rigid gas permeable (RGP) contact lenses is typically much better than that achievable using so-called "soft" contact lenses. Nonetheless, many patients choose to wear soft contact lenses because they are found to be more comfortable than conventional RGP lenses. It is believed that some of the comfort problems associated with conventional RGP contact lenses are the result of inadequate tear flow under the lens due to poor lens design. A need therefor exists, for a RGP contact lens design that provides improved tear flow under the lens, resulting in improved comfort to the wearer.

SUMMARY OF THE INVENTION

The present invention disclosed and claimed herein comprises, in one aspect thereof, a rigid gas permeable (RGP) contact lens for wearing on a post-transplant cornea of a patient's eye, where the post-transplant cornea has a corneal astigmatism of at least 3.0 diopters, an annular surgical junction with a median diameter of about 8 mm and a region of traumatized tissue extending radially outward from the surgical junction. The contact lens comprises a lens body formed of a rigid gas permeable material having an anterior surface adapted to face away from the post-transplant cornea, a posterior surface adapted to face toward the post-transplant cornea, and an overall diameter within the range from about 9.5 mm to about 10.4 mm. The posterior surface has a circular optical zone disposed in its center spanning the region of traumatized tissue, an annular secondary zone coupled to the optical zone and extending radially therefrom across the region of traumatized tissue, and an annular peripheral zone coupled to the secondary zone and extending radially therefrom. The optical zone has a diameter within the range from about 7.7 mm to about 8.9 mm, and has a spherical, rearwardly concave curvature with a constant radius of curvature within the range from about 7.3 mm to about 8.2 mm. The secondary zone has a radial width on each side of the optical zone within the range from about 0.2 mm to about 0.3 mm, and has an aspheric, rearwardly concave curvature with a radius of curvature that varies continuously as it transitions between the optical zone and the peripheral zone. The peripheral zone has a radial width on each side of the secondary zone within the range from about 0.3 mm to about 0.5 mm, and has a spherical, rearwardly concave curvature with a constant radius of curvature within the range from about 11.0 mm to about 13.0 mm. When the lens is positioned on the post-transplant cornea such that the peripheral zone is disposed radially outside the region of traumatized tissue, the peripheral zone will adhere to the cornea with a relatively thin tear film while a relatively thick tear film will be trapped between the optical zone and the cornea and maintained by sealing action of the secondary zone.

The present invention disclosed and claimed herein comprises, in another aspect thereof, a rigid gas permeable (RGP) contact lens for wearing on a post-surgical cornea of a patient's eye, where the post-surgical cornea has an annular surgical junction with a junction diameter and a region of traumatized tissue extending radially outward from the surgical junction. The contact lens comprises a lens body formed of a rigid gas permeable material having an anterior surface adapted to face away from the post-surgical cornea, a posterior surface adapted to face toward the post-surgical cornea, and an overall diameter within the range from about 119% to about 130% of the value of the junction diameter. The posterior surface has a circular optical zone disposed in its center spanning the surgical junction, an annular secondary zone coupled to the optical zone and extending radially therefrom across the region of traumatized tissue, and an annular peripheral zone coupled to the secondary zone and extending radially therefrom. The optical zone has a diameter within the range from about 96% to about 111% of the value of the junction diameter and has a spherical, rearwardly concave curvature with a constant radius of curvature. The secondary zone has a radial width on each side of the optical zone within the range from about 2.5% to about 3.8% of the value of the junction diameter and has an aspheric, rearwardly concave curvature with a radius of curvature that varies continuously as it transitions between the optical zone and the peripheral zone. The peripheral zone has a radial width on each side of the secondary zone within the range from about 3.8% to about 6.3% of the value of the junction diameter and has a spherical, rearwardly concave curvature with a constant radius of curvature. When the lens is positioned on the post-surgical cornea such that the peripheral zone is disposed radially outside the surgical junction, the peripheral zone will adhere to the cornea with a relatively thin tear film while a relatively thick tear film will be trapped between the optical zone and the cornea.

The present invention disclosed and claimed herein comprises, in a further aspect thereof, a contact lens for wearing on a patient's eye. The contact lens comprises an anterior surface adapted to face away from the eye and a posterior surface adapted to face toward the eye. The posterior surface has an optical zone disposed in the center of the lens, a secondary zone coupled to the optical zone and extending radially therefrom, and a peripheral zone coupled to the secondary zone and extending radially therefrom. The curve of the optical zone is spherical and rearwardly concave, the curve of the secondary zone is aspheric and rearwardly concave, and the curve of the peripheral zone is spherical and rearwardly concave.

BRIEF DESCRIPTION OF THE DRAWINGS

FIG. 1 is across-sectional side view of a contact lens in accordance with a first embodiment;

FIG. 2 is an elevation view of the contact lens of FIG. 1;

DETAILED DESCRIPTION OF THE INVENTION

The current invention is described below in greater detail with reference to certain preferred embodiments illustrated in the accompanying drawings.

Figure 3:
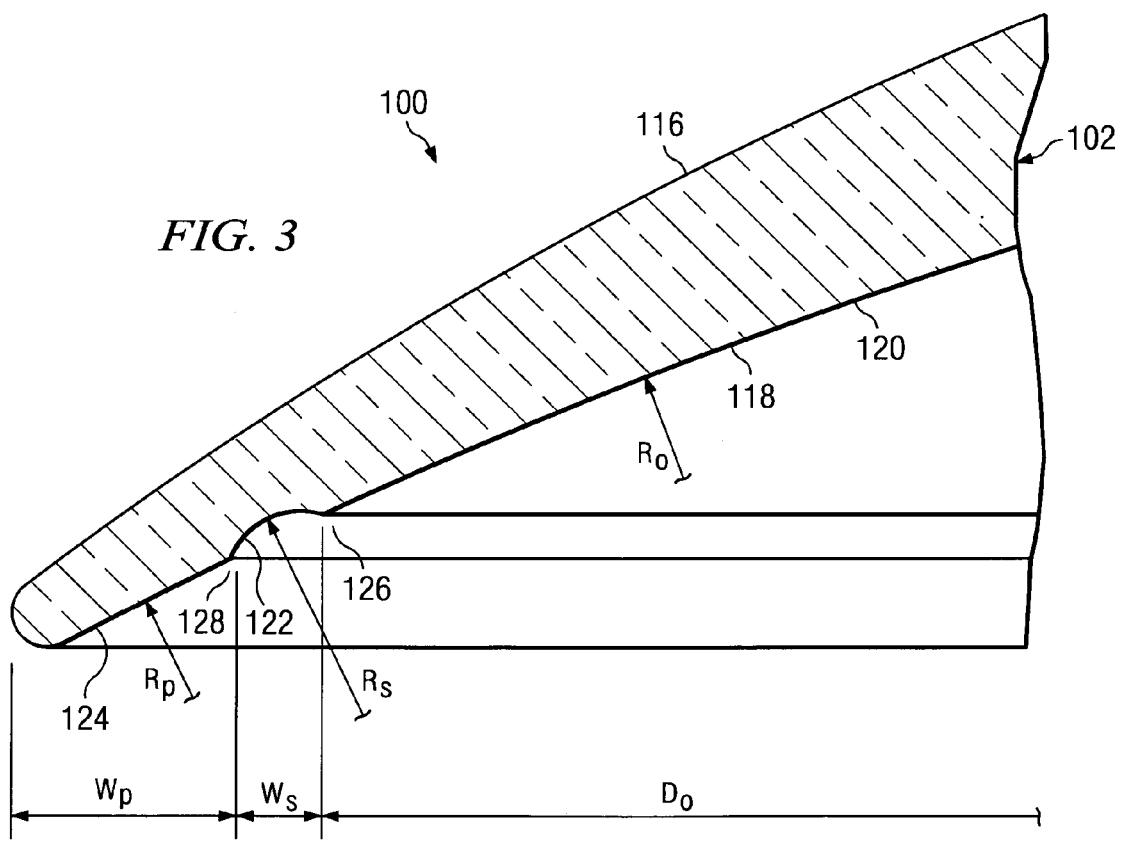
FIG. 3 is an enlarged cross-sectional view of the outer portion of the contact lens.

Referring now to FIGS. 1–3, there is illustrated a contact lens in accordance with one embodiment of the current invention. Specifically, FIG. 1 is a cross-sectional side view of the lens, FIG. 2 is an elevation view of the lens, and FIG. 3 is an enlarged cross-sectional view of the outer portion of the lens. It will be appreciated that the proportions and curvatures shown in FIGS. 1–3 are not necessarily to scale and may be exaggerated for purposes of illustration.

The contact lens 100 is preferably a so-called "rigid gas permeable" lens formed of a conventional FDA-approved rigid gas permeable (RGP) polymer material. One such RGP material determined to be well suited for use is Fluorperm 30, available from The Paragon Vision Sciences Co. Other known RGP materials, including silicone acrylates and/or fluoro-silicone acrylates may also be used. While not preferred, other materials, including conventional soft contact lens materials and conventional hard contact lens materials, may be used in other embodiments of the invention.

As best seen in FIGS. 1 and 2, the contact lens 100 includes a lens body 102 that is substantially radially symmetrical about a central axis 104 and has an anterior (i.e., front) surface 116 adapted to face away from the patient's cornea (not shown) and a posterior (i.e., rear) surface 118 adapted to face toward the cornea. The lens body 102 has an overall diameter OD (measured perpendicular to the central axis 104) within the range from about 9.5 mm to about 10.4 mm, with the preferred value for OD being within the range from about 9.8 mm to about 10.2 mm, and the more preferred value for OD being within the range from about 10.0 mm to about 10.2 mm. This overall diameter has been found to minimize the discomfort normally associated with post-operative contact lens wear. In contrast, conventional contact lenses have a typical overall diameter of about 9.0 mm.

The posterior surface 118 of the contact lens 100 has three curvature zones, namely, an optical zone 120 disposed in the center of the lens about the central axis 104, an annular secondary zone 122 coupled to the periphery of the optical zone and extending radially therefrom, and an annular peripheral zone 124 coupled to the periphery of the secondary zone and extending radially therefrom. The curve of the optical zone 120 is spherical and rearwardly concave, the curve of the secondary zone 122 is aspheric and rearwardly concave, and the curve of the peripheral zone 124 is spherical and rearwardly concave.

The optical zone 120 has a diameter $D_O$ within the range from about 7.7 mm to about 8.9 mm, preferably within the range from about 8.0 mm to about 8.7 mm, and more preferably within the range from about 8.5 mm to about 8.7 mm. The spherical base curve of the optical zone 120 is selected to provide the proper lens-to-cornea relationship. Preferably, the spherical curve of the optical zone 120 has a constant radius of curvature, $R_O$, within the range from about 7.3 mm to about 8.2 mm, and more preferably, within the range from about 7.4 mm to about 8.1 mm.

For efficiently fitting a patient with a contact lens according to the current invention, the initial base curve of the optical zone 120 may be approximated as follows: For a spherical cornea, the radius of curvature $R_O$ of the optical zone 120 is selected to equal the curve of the cornea. For an astigmatic cornea, including corneas having severe astigmatism of 3.0 diopters or higher, two standard keratometry readings (i.e., "K readings") are taken, typically in perpendicular planes, and an amount equal to 25% of the difference (in diopters) between the two K readings is added to the flatter of the two K reading to yield the approximate radius of curvature $R_O$ of the optical zone 120. This approximation provides a reliable $R_O$ starting point for the fitting procedure. A medical professional first tests a fitting lens in accordance with the current invention having the calculated $R_O$ on the patient. The fit may quickly be adjusted to accommodate the patient's exact needs, including cases of severe astigmatism, by test fitting additional fitting lenses with incrementally different $R_O$. In contrast, there is no simple way to determine an initial prescription for the fitting of bi-toric contact lenses and other types of contact lenses previously used for treating severely astigmatic and/or post-surgical corneas. Medical professionals using conventional lenses must thus resort to "trial and error" methods that are inefficient and frustrating for both the doctor and the patient.

The secondary zone 122 has a radial width (i.e., on each side of the optical zone), $W_S$, that is within the range from about 0.2 mm to about 0.3 mm, preferably between about 0.225 mm and 0.275 mm, and more preferably, is about 0.25 mm. The relatively narrow width $W_S$ of the secondary zone 122 is believed to be an important element of this invention, because experiments have indicated that the complete lack of an aspherical zone between the spherical optical zone 120 and the spherical peripheral zone 124 will adversely affects wearer comfort (e.g., by producing a curvature junction that irritates the cornea), whereas other experiments have indicated that making the aspherical secondary zone too wide results in excessive lens mobility and/or inadequate centration, both of which also adversely affect wearer comfort. The aspheric curve of the secondary zone 122 has a radius of curvature $R_S$ that varies continuously as it transitions between the optical zone 120 and the peripheral zone 124. Preferably, the radius of curvature $R_S$ of the secondary zone 122 varies continuously within the range from about 2.0 mm to about 3.5 mm.

The peripheral zone 124 has a radial width (i.e., on each side of the optical zone), $W_P$, within the range from about 0.3 mm to about 0.5 mm, and preferably within the range from about 0.4 mm to about 0.5 mm. The spherical curve of the peripheral zone 124 has a constant radius of curvature, $R_P$, that is greater than the radius of curvature of the optical zone 120, preferably within the range from about 11.0 mm to about 13.0 mm, and more preferably within the range from about 12.0 mm to about 12.5 mm. By changing the radius $R_P$ of the peripheral zone 124, the adherence fit of the lens 100 can be adjusted to "loosen" (i.e., add mobility) or "tighten" (i.e., reduce mobility) the lens on the cornea.

As best seen in FIG. 3, the transition points 126 and 128, disposed at the junction between the optical zone 120 and secondary zone 122, and at the junction between the secondary zone and the peripheral zone 124, respectively, both present a smooth "blended" surface to the cornea as they are at the limits of the aspheric secondary curve. The design of the posterior surface 118 of the lens 100 avoids any abrupt curvature transitions that might irritate the traumatized tissue of the post-operative eye.

Functionally, the optical zone 116 (in conjunction with the curvature of the anterior surface 116) is the only portion of the contact lens 100 providing refractive correction of the patient's vision. As further described herein below, the secondary zone 118 provides comfort and vaulting of post-operative in-situ corneal sutures on corneal transplant cases and corneal trauma cases. The peripheral zone 120 provides better lens centration on the eye.

In addition, the unique combination of curvature and placement of the three zones 120, 122 and 124 on the posterior surface 118 of the contact lens 100 greatly increases tear flow between the lens 100 and the eye compared to conventional contact lenses. The aspheric curve of the secondary zone 122 allows tears to readily flow under the lens, while the radius and spherical curve of the peripheral zone 124 traps and holds these tears. This combined action is believed to create a relatively thick tear film behind the secondary zone 122 and optical zone 120 that both improves comfort and acts to reduce or cancel the effects of significant astigmatism or other surface irregularities that normally affect the optical zone 120. This is because the tear film has a refractive index that is substantially identical to that of corneal tissue. Thus, by maintaining a tear film in the space between the surface of the astigmatic cornea and the optical zone 120 of the lens, the resultant refraction is similar to that of a spherical cornea.

Contact lenses in accordance with the current invention have been used to successfully correct the vision of post-operative patients having very high (i.e., severe) levels of astigmatism, levels that would conventionally be correctable only by using complex bi-toric contact tenses (if at all). In contrast, standard contact lenses without the aspheric secondary zone 122 generally impede tears from flowing under the lens, thus the relatively thick tear film cannot form beneath the lens, and the associated benefits to comfort and vision correction are not achieved.

Figure 4:
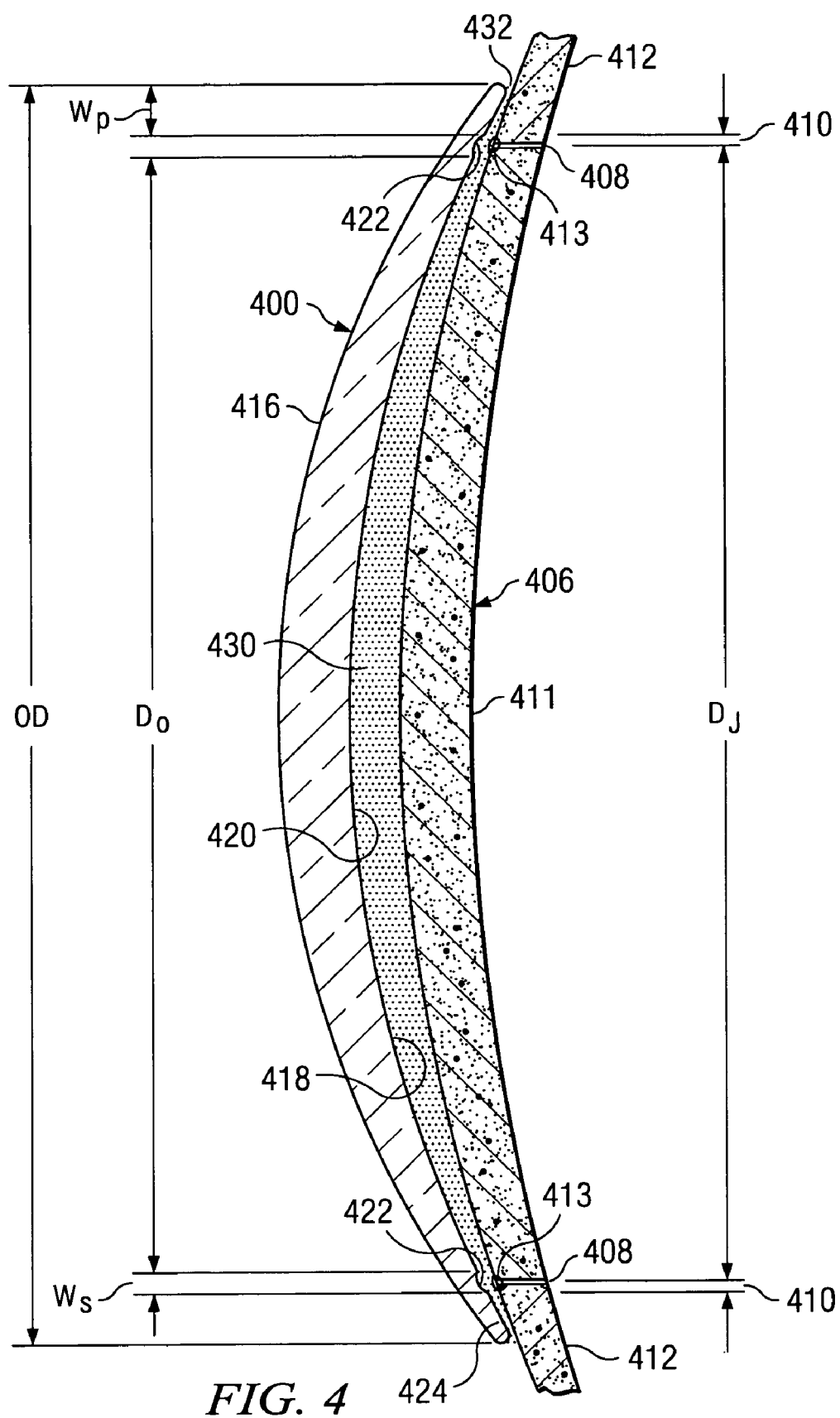
FIG. 4 is a cross-sectional side view showing the fit between a cornea and a contact lens in accordance with another embodiment of the invention.

Referring now to FIG. 4, there is illustrated a contact lens 400 in accordance with another embodiment fitted to a post-surgery cornea 406. The post-surgery cornea 406 includes an annular surgical junction 408 having a junction diameter $D_J$ surrounded by a region of traumatized tissue 410 extending radially outward from the surgical junction. In the embodiment shown in FIG. 4, the cornea 406 is a post-cornea-transplant cornea having an 8 mm diameter "button" 411 of donor cornea tissue that has been attached to the patient's original cornea 412 using sutures 413. In this case, the surgical junction 408 has a junction diameter $D_J$ of about 8 mm, and the traumatized tissue region 410 includes the annular area of the original cornea just outside (radially) the surgical junction that has been injured by the sutures 413. Although not shown, the cornea 406 may have a severe corneal astigmatism of 3.0 diopters or more, as determined by taking the difference of two perpendicular K readings.

The contact lens 400 is substantially similar to the contact lens 100 previously described herein, having a lens body 402 formed of a rigid gas permeable material with an anterior surface 416 adapted to face away from the cornea 406 and a posterior surface 418 adapted to face toward the cornea. The posterior surface 418 of the contact lens 400 has three curvature zones, namely, an optical zone 420 disposed in the center of the lens, an annular secondary zone 422 coupled to the periphery of the optical zone and extending radially therefrom, and an annular peripheral zone 424 coupled to the periphery of the secondary zone and extending radially therefrom. The curve of the optical zone 420 is spherical and rearwardly concave, the curve of the secondary zone 422 is aspheric and rearwardly concave, and the curve of the peripheral zone 424 is spherical and rearwardly concave. When the lens 400 is positioned on the post-surgery cornea 406 such that the peripheral zone 424 is disposed radially outside the region of traumatized tissue 410, the peripheral zone will adhere to the cornea with a relatively thin tear film 430 while a relatively thick tear film 432 will be trapped between the optical zone 420 and the cornea and maintained by sealing action of the secondary zone 422.

In an embodiment of contact lens 400 for use on a post-surgical cornea having a surgical junction diameter $D_J$ of about 8 mm (e.g., a post-cornea-transplant cornea), the lens body 402 has an overall diameter OD within the range from about 9.5 mm to about 10.4 mm, with the preferred value for OD being within the range from about 9.8 mm to about 10.2 mm and the more preferred value for OD being within the range from about 10.0 mm to about 10.2 mm. The optical zone 420 has a diameter $D_O$ within the range from about 7.7 mm to about 8.9 mm, preferably within the range from about 8.0 mm to about 8.7 mm, and more preferably within the range from about 8.5 mm to about 8.7 mm. The spherical base curve of the optical zone 420 is selected to provide the proper lens-to-cornea relationship. Preferably, the spherical curve of the optical zone 420 has a constant radius of curvature $R_O$ within the range from about 7.3 mm to about 8.2 mm, and more preferably, within the range from about 7.4 mm to about 8.1 mm.

In the embodiment of lens 400 having a surgical junction diameter $D_J$ of about 8 mm, the secondary zone 422 has a radial width $W_S$ within the range from about 0.2 mm to about 0.3 mm, preferably between about 0.225 mm and 0.275 mm, and more preferably, is about 0.25 mm. The aspheric curve of the secondary zone 422 has a radius of curvature $R_S$ that varies continuously as it transitions between the optical zone 420 and the peripheral zone 424. Preferably, the radius of curvature $R_S$ of the secondary zone 422 varies continuously within the range from about 2.0 mm to about 3.5 mm. The peripheral zone 424 has a radial width $W_P$ within the range from about 0.3 mm to about 0.5 mm, and preferably within the range from about 0.4 mm to about 0.5 mm. The spherical curve of the peripheral zone 424 has a constant radius of curvature $R_P$, that is greater than the radius of curvature of the optical zone 420, preferably within the range from about 11.0 mm to about 13.0 mm, and more preferably within the range from about 12.0 mm to about 12.5 mm.

While the contact lens 400 of the embodiment just described is well suited for use on post-cornea-transplant corneas having a surgical junction diameter $D_J$ of about 8 mm, alternative embodiments may be used on post-surgical corneas having a different junction diameter $D_J$. In such embodiments, the lens body 402 has an overall diameter OD within the range from about 119% to about 130% of the value of the junction diameter, with the preferred value for OD being within the range from about 123% to about 128% of the value of the junction diameter, and the more preferred value for OD being within the range from about 125% to about 128% of the value of the junction diameter. The optical zone 420 has a diameter $D_O$ within the range from about 96% to about 111% of the value of the junction diameter, preferably within the range from about 100% to about 109% of the value of the junction diameter, and more preferably within the range from about 106% to about 109% of the value of the junction diameter. The spherical curve of the optical zone 420 has a constant radius of curvature $R_O$ within the range from about 91% to about 103% of the value of the junction diameter, and more preferably, within the range from about 93% to about 101% of the value of the junction diameter.

In the alternative embodiment of lens 400 having a surgical junction diameter $D_J$, the secondary zone 422 has a radial width $W_S$ within the range from about 2.5% to about 3.8% of the value of the junction diameter, preferably between about 2.8% to about 3.4% of the value of the junction diameter, and more preferably, is about 3.1% of the value of the junction diameter. The aspheric curve of the secondary zone 422 has a radius of curvature $R_S$ that varies continuously as it transitions between the optical zone 420 and the peripheral zone 424. Preferably, the radius of curvature $R_S$ of the secondary zone 422 varies continuously within the range from about 25% to about 44% of the value of the junction diameter. The peripheral zone 424 has a radial width $W_P$ within the range from about 3.8% to about 6.3% of the value of the junction diameter, and preferably within the range from about 5.0% to about 6.3% of the value of the junction diameter. The spherical curve of the peripheral zone 424 has a constant radius of curvature $R_P$, that is greater than the radius of curvature of the optical zone 420, preferably within the range from about 138% to about 163% of the value of the junction diameter, and more preferably within the range from about 150% to about 156% of the value of the junction diameter.

The following Examples represent the fitting of various contact lenses in accordance with the current invention on actual patients, and the results obtained therefrom. In these examples, the following abbreviations are used:

D=diopters

OD=Overall diameter of the lens in mm.

$D_O$=Diameter of the Optical Zone (total) in mm.

$W_S$=Radial width of the Secondary Zone (each side) in mm.

$W_P$=Radial width of the Peripheral Zone (each side) in mm.

$R_O$=Radius of curvature of the Optical Zone in mm.

$R_S$=Radius of curvature of the Secondary Zone in mm.

$R_P$=Radius of curvature of the Peripheral Zone in mm.

Example 1

Patient ID #100

| | Right Eye: | | Left Eye: |
|---|---|---|---|
| KM: | 44.25 D (7.63 mm) @ H | KM: | 44.00 D (7.67 mm) @ H |
| | 47.25 D (7.14 mm) @ V | | 47.75 D (7.07 mm) @ V |
| | Corneal astigmatism = 3.00 D | | Corneal astigmatism = 3.75 D |

-continued

|  | Right Eye: |  |  | Left Eye: |  |
|---|---|---|---|---|---|
| Refraction: | −3.50 D (refrac.) |  | Refraction: | −7.25 D (refrac.) |  |
|  | +3.25 D (astig.) @ 123 (axis) |  |  | +4.50 D (astig.) @ 073 (axis) |  |
| Lens Specs.: | OD = 10.2 |  | Lens Specs: | OD = 10.2 |  |
|  | $D_O = 8.7$ | $R_O = 7.67$ |  | $D_O = 8.7$ | $R_O = 7.65$ |
|  | $W_S = 0.25$ | $R_S$ = aspheric |  | $W_S = 0.25$ | $R_S$ = aspheric |
|  | $W_P = 0.50$ | $R_P = 12.00$ |  | $W_P = 0.50$ | $R_P = 12.00$ |
| Corrective Lens Prescrip: | Rx = −3.75 D |  | Corrective Lens Prescrip: | Rx = −4.75 D |  |

Comments/Results: Initial diagnosis of severe corneal scarring and severe irregular astigmatism. Patient was termed a "Limited Vision Potential" by corneal surgeons. When fit with the above lenses, vision was 20/15 in both eyes. Lenses (RGP) were very comfortable per the patient. Final $V_A$: OD 20/15; OS 20/15.

Example 2

Patient ID #101

|  | Right Eye: |  |  | Left Eye: |  |
|---|---|---|---|---|---|
| KM: | 44.00 D (7.67 mm) @ H |  | KM: | 45.00 D (7.50 mm) @ H |  |
|  | 41.50 D (8.13 mm) @ V |  |  | 41.00 D (8.23 mm) @ V |  |
|  | Corneal astigmatism = 2.50 D |  |  | Corneal astigmatism = 4.00 D |  |
| Refraction: | n/a D (refrac.) |  | Refraction: | n/a D (refrac.) |  |
|  | +3.00 D (astig.) @ n/a (axis) |  |  | +4.00 D (astig.) @ n/a (axis) |  |
| Lens Specs.: | OD = 10.0 |  | Lens Specs: | OD = 10.0 |  |
|  | $D_O = 8.5$ | $R_O = 8.00$ |  | $D_O = 8.5$ | $R_O = 8.04$ |
|  | $W_S = 0.25$ | $R_S$ = aspheric |  | $W_S = 0.25$ | $R_S$ = aspheric |
|  | $W_P = 0.50$ | $R_P = 12.50$ |  | $W_P = 0.50$ | $R_P = 12.00$ |
| Corrective Lens Prescrip: | Rx = −8.00 D |  | Corrective Lens Prescrip: | Rx = −9.00 D |  |

Comments/Results: Patient was diagnosed with Keratoconus in the right eye and a corneal transplant in the left eye. She had previously been fitted with bitoric lenses but her vision was 20/40 and the lenses were very uncomfortable. When refitted with above lenses, her vision was 20/20 in both eyes and she is now very comfortable. Final $V_A$: OD 20/20; OS 20/20.

Example 3

Patient ID #102

|  | Right Eye: |  |  | Left Eye: |  |
|---|---|---|---|---|---|
| KM: | 41.00 D (8.23 mm) @ H |  | KM: | 41.00 D (8.23 mm) @ H |  |
|  | 46.50 D (7.26 mm) @ V |  |  | 46.50 D (7.62 mm) @ V |  |
|  | Corneal astigmatism = 5.50 D |  |  | Corneal astigmatism = 5.50 D |  |
| Refraction: | n/a D (refrac.) |  | Refraction: | n/a D (refrac.) |  |
|  | +5.50 D (astig.) @ n/a (axis) |  |  | +5.50 D (astig.) @ n/a (axis) |  |
| Lens Specs.: | OD = 10.0 |  | Lens Specs: | OD = 10.0 |  |
|  | $D_O = 8.5$ | $R_O = 8.00$ |  | $D_O = 8.5$ | $R_O = 8.00$ |
|  | $W_S = 0.25$ | $R_S$ = aspheric |  | $W_S = 0.25$ | $R_S$ = aspheric |
|  | $W_P = 0.50$ | $R_P = 12.00$ |  | $W_P = 0.50$ | $R_P = 12.00$ |
| Corrective Lens Prescrip: | Rx = +3.00 D |  | Corrective Lens Prescrip: | Rx = +2.50 D |  |

Comments/Results: Severe astigmatism diagnosis. Wore bitoric lenses and had poor vision and old lenses were very uncomfortable. Refitted with lenses above in spherical base curves and vision is 20/20 in each eye and lenses are very comfortable. Final $V_A$: OD 20/20; OS 20/20.

Example 4

Patient ID #103

|  | Right Eye: |  | Left Eye: |
|---|---|---|---|
| KM: | 44.00 D (7.67 mm) @ H<br>46.50 D (7.26 mm) @ V<br>Corneal astigmatism = 2.50 D | KM: | 53.25 D (6.35 mm) @ H<br>45.50 D (7.42 mm) @ V<br>Corneal astigmatism = 7.75 D |
| Refraction: | −1.25 D (refrac.)<br>+0.50 D (astig.) @ 008 (axis) | Refraction: | −2.00 D (refrac.)<br>+1.75 D (astig.) @ 084 (axis) |
| Lens Specs.: | $OD = 10.2$<br>$D_O = 8.7$ $R_O = 7.70$<br>$W_S = 0.25$ $R_S$ = aspheric<br>$W_P = 0.50$ $R_P = 12.50$ | Lens Specs: | $OD = 10.2$<br>$D_O = 8.7$ $R_O = 7.50$<br>$W_S = 0.25$ $R_S$ = aspheric<br>$W_P = 0.50$ $R_P = 12.50$ |
| Corrective<br>Lens Prescrip: | Rx = −0.50 D | Corrective<br>Lens Prescrip: | Rx = +1.00 D |

Comments/Results: Patient has a diagnosis of Keratoconus for years with reduced vision. After fitting with above lenses her vision was 20/25. She thanked me for "best fit in 10 years" and "the last 5 or 6 doctors." She was so happy. Final $V_A$: OD 20/25 - instruments could not properly read distorted ectatic corneas; OS 20/30; OU 20/25 both.

Example 5

Patient ID #104

|  | Right Eye: | Left Eye |
|---|---|---|
| KM: | 43.50 D (7.76 mm) @ H<br>47.00 D (7.18 mm) @ V<br>Corneal astigmatism = 3.50 D | (Not fitted) |
| Refraction: | −9.75 D (refrac.)<br>+4.75 D (astig.) @ 148 (axis) |  |
| Lens Specs.: | $OD = 10.0$<br>$D_O = 8.5$ $R_O = 7.80$<br>$W_S = 0.25$ $R_S$ = aspheric<br>$W_P = 0.50$ $R_P = 12.00$ |  |
| Corrective<br>Lens Prescrip: | Rx = −6.25 D |  |

Comments/Results: Keratoconus patient with severe astigmatism (both corneal and refractive). Had been fit previously in a bitoric lens: it was uncomfortable and vision was 20/30. Refitted with the above spherical lens, vision was 20/20 and very comfortable to wear. Final $V_A$: OD 20/20.

Example 6

Patient ID #105

|  | Right Eye: | Left Eye |
|---|---|---|
| KM: | 44.00 D (7.67 mm) @ H<br>50.00 D (6.75 mm) @ V<br>Corneal astigmatism = 6.00 D | (Not fitted) |
| Refraction: | n/a D (refrac.)<br>n/a D (astig.) @ n/a (axis) |  |
| Lens Specs.: | $OD = 10.0$<br>$D_O = 8.5$ $R_O = 7.40$<br>$W_S = 0.25$ $R_S$ = aspheric<br>$W_P = 0.50$ $R_P = 12.00$ |  |
| Corrective<br>Lens Prescrip: | Rx = −1.00 D |  |

Comments/Results: Patient had a transplanted cornea and had been fit in right eye with a bitoric lens with eye glasses over the bitoric lens. The lens above gave patient 20/20 vision and comfort without bitoric contacts or eye glasses. Patient very happy!! Final $V_A$: OD 20/20.

Example 7

Patient ID #106

|  | Right Eye: |  | Left Eye: |
|---|---|---|---|
| KM: | 49.50 D (6.82 mm) @ H<br>46.50 D (7.26 mm) @ V<br>Corneal astigmatism = 3.00 D | KM: | 46.00 D (7.34 mm) @ H<br>45.00 D (7.50 mm) @ V<br>Corneal astigmatism = 1.00 D |
| Refraction: | n/a D (refrac.)<br>n/a D (astig.) @ n/a (axis) | Refraction: | n/a D (refrac.)<br>n/a D (astig.) @ n/a (axis) |
| Lens Specs.: | $OD = 10.2$<br>$D_O = 8.7$ $R_O = 7.50$<br>$W_S = 0.25$ $R_S$ = aspheric<br>$W_P = 0.50$ $R_P = 12.50$ | Lens Specs: | $CD = 10.2$<br>$D_O = 8.7$ $R_O = 7.58$<br>$W_S = 0.25$ $R_S$ = aspheric<br>$W_P = 0.50$ $R_P = 12.50$ |
| Corrective<br>Lens Prescrip: | Rx = −8.25 D | Corrective<br>Lens Prescrip: | Rx = −9.00 D |

Comments/Results: Patient has Keratoconus. Despite severe astigmatism and damaged corneas, patient sees 20/20 in right and left eyes and stated "Most comfortable lenses I've ever had." Patient had stopped wearing previous lenses due to discomfort. Final $V_A$: OD 20/20; OS 20/20.

Example 8

Patient ID #107

| Right Eye | Left Eye: | |
|---|---|---|
| (Not fitted) KM: | 50.00 D (6.75 mm) @ H | |
| | 44.50 D (7.58 mm) @ V | |
| | Corneal astigmatism = 5.50 D | |
| Refraction: | −6.00 D (refrac.) | |
| | +5.25 D (astig.) @ 087 (axis) | |
| LensSpecs: | $OD = 10.0$ | |
| | $D_O = 8.5$ | $R_O = 7.50$ |
| | $W_S = 0.25$ | $R_S$ = aspheric |
| | $W_P = 0.50$ | $R_P = 12.50$ |
| Corrective Lens Prescrip: | $Rx = -3.00$ D | |

Comments/Results: Left eye had corneal transplant secondary to Keratoconus. Fitted with lens above. Vision is now 20/15 and patient very happy and comfortable. Severe astigmatism in transplanted cornea resolved with lens above. (Note measurements of diseased cornea nearly same as transplant.). Final $V_A$: OS 20/15.

Example 9

Patient ID #108

| | Right Eye: | Left Eye: | |
|---|---|---|---|
| (Refit in progress) KM: | | 43.00 D (7.85 mm) @ H | |
| | | 42.00 D (8.04 mm) @ V | |
| | | Corneal astigmatism = 1.00 D | |
| Refraction: | | n/a D (refrac.) | |
| | | n/a D (astig.) @ n/a (axis) | |
| Lens Specs: | | $OD = 10.0$ | |
| | | $D_O = 8.5$ | $R_O = 8.00$ |
| | | $W_S = 0.25$ | $R_S$ = aspheric |
| | | $W_P = 0.50$ | $R_P = 12.50$ |
| Corrective Lens Prescrip: | | $Rx = -1.00$ D | |

Comments/Results: Patient had cornea transplants on both eyes. Patient had 24 stitches in transplant during fitting. When fitted with lens above, patient was so happy she requested refit of her right eye with lens in accordance with invention also. Vision is 20/20 in each eye now, and patient very happy. "I could not even feel the lens from the first moment I put it on" patient stated. She said she was "ecstatic." Final $V_A$: OD 20/20; OS 20/20.

Example 10

Patient ID #109

| | Right Eye: | | | Left Eye: | |
|---|---|---|---|---|---|
| KM: | 47.00 D (7.18 mm) @ H | | KM: | 44.50 D (7.58 mm) @ H | |
| | 45.00 D (7.50 mm) @ V | | | 40.50 D (8.33 mm) @ V | |
| | Corneal astigmatism = 2.00 D | | | Corneal astigmatism = 4.00 D | |
| Refraction: | n/a D (refrac.) | | Refraction: | n/a D (refrac.) | |
| | n/a D (astig.) @ n/a (axis) | | | n/a D (astig.) @ n/a (axis) | |
| Lens Specs.: | $OD = 10.2$ | | Lens Specs: | $OD = 10.2$ | |
| | $D_O = 8.7$ | $R_O = 7.58$ | | $D_O = 8.7$ | $R_O = 8.10$ |
| | $W_S = 0.25$ | $R_S$ = aspheric | | $W_S = 0.25$ | $R_S$ = aspheric |
| | $W_P = 0.50$ | $R_P = 12.50$ | | $W_P = 0.50$ | $R_P = 12.00$ |
| Corrective Lens Prescrip: | $Rx = -4.50$ D | | Corrective Lens Prescrip: | $Rx = -2.00$ D | |

Comments/Results: After fitting with lens above, patient stated "I am so thrilled, I have not driven in years and could not see my T.V. I just sat home all day by my radio," and "I drove myself here today - alone!" Vision 20/20 in each eye. Both eyes have transplanted corneas uncorrected vision is "count fingers" only. Legally blind despite transplants. It took only one lens trial to fit her. Final $V_A$: OD 20/20; OS 20/20.

While the invention has been shown or described in a variety of its forms, it should be apparent to those skilled in the art that it is not limited to these embodiments, but is susceptible to various changes without departing from the scope of the invention.

What is claimed is:

1. A rigid gas permeable (RGP) contact lens for wearing on a post-transplant cornea of a patient's eye, where the post-transplant cornea has a corneal astigmatism of at least 3.0 diopters, an annular surgical junction with a median diameter of about 8 mm and a region of traumatized tissue extending radially outward from the surgical junction, the contact lens comprising:

a lens body formed of a rigid gas permeable material having an anterior surface adapted to face away from the post-transplant cornea, a posterior surface adapted to face toward the post-transplant cornea, and an overall diameter within the range from about 9.5 mm to about 10.4 mm;- the posterior surface having a circular optical zone disposed in its center spanning the region of traumatized tissue, an annular secondary zone coupled to the optical zone and extending radially therefrom across the region of traumatized tissue, and an annular peripheral zone coupled to the secondary zone and extending radially therefrom;

the optical zone having a diameter within the range from about 7.7 mm to about 8.9 mm, and having a spherical, rearwardly concave curvature with a constant radius of curvature within the range from about 7.3 mm to about 8.2 mm;

the secondary zone having a radial width on each side of the optical zone within the range from about 0.2 mm to about 0.3 mm, and having an aspheric, rearwardly concave curvature with a radius of curvature that varies continuously as it transitions between the optical zone and the peripheral zone; and the peripheral zone having a radial width on each side of the secondary zone within the range from about 0.3 mm to about 0.5 mm, and having a spherical, rearwardly concave curvature with a constant radius of curvature within the range from about 11.0 mm to about 13.0 mm;

wherein, when the tens is positioned on the post-transplant cornea such that the peripheral zone is disposed radially outside the region of traumatized tissue, the peripheral zone will adhere to the cornea with a relatively thin tear film while a relatively thick tear film will be trapped between the optical zone and the cornea and maintained by sealing action of the secondary zone.

2. A RGP contact lens in accordance with claim 1, wherein if the corneal astigmatism of the post-transplant cornea is characterized by a difference between first and second kerotometric readings taken in perpendicular planes, then the curvature of the spherical curve of the optical zone of the lens has a value in diopters equal to the value in diopters of the flatter of the first and the second kerotometric readings added to the value of 25% of the difference between the first and the second kerotometric readings in diopters.

3. A RGP contact lens in accordance with claim 1, wherein the aspheric, rearwardly concave curvature of the secondary zone has a continuously variable radius of curvature that varies from about 2.0 mm to about 3.5 mm.

4. A RGP contact lens in accordance with claim 3, wherein the overall diameter of the lens is within the range from about 9.8 mm to about 10.2 mm.

5. A RGP contact lens in accordance with claim 4, wherein:

the optical zone has a diameter within the range from about 8.0 mm to about 8.7 mm;

the secondary zone having a radial width on each side of the optical zone within the range from about 0.225 mm to about 0.275 mm; and the peripheral zone having a radial width on each side of the secondary zone within the range from about 0.4 mm to about 0.5 mm.

6. A RGP contact lens in accordance with claim 1, wherein the overall diameter of the lens is within the range from about 10.0 mm to about 10.2 mm.

7. A RGP contact lens in accordance with claim 6 wherein:

the optical zone has a diameter within the range from about 8.5 mm to about 8.7 mm;

the secondary zone has a radial width on each side of the optical zone of about 0.25 mm; and the peripheral zone has a radial width on each side of the secondary zone about 0.5 mm.

8. A RGP contact lens in accordance with claim 7 wherein:

the spherical, rearwardly concave curvature of the optical zone has a constant radius of curvature within the range from about 7.4 mm to about 8.1 mm;

the aspheric, rearwardly concave curvature of the secondary zone has a continuously variable radius of curvature that varies from about 2.0 mm to about 3.5 mm; and the spherical, rearwardly concave curvature of the peripheral zone has a constant radius of curvature within the rage from about 12.0 mm to about 12.5 mm.

9. A contact lens in accordance with claim 2, wherein the lens has an overall diameter within the range from about 9.8 mm to about 10.2 mm.

10. A contact lens in accordance with claim 4, wherein the optical zone has a diameter within the range from about 8.0 mm to about 8.5 mm.

11. A contact lens in accordance with claim 1, wherein the spherical base curve of the optical zone is about equal to the curve of the eye's cornea, the aspheric curve of the secondary zone has a radius of curvature that varies continuously within the range from about 2.0 mm to about 3.5 mm and the spherical curve of the peripheral zone has a radius of curvature that is greater than the radius of curvature of the optical zone.

12. A contact lens in accordance with claim 1, wherein the lens material is a FDA-approved rigid gas permeable polymer.

13. A rigid gas permeable (RGP) contact lens for wearing on a post-surgical cornea of a patient's eye, where the post-surgical cornea has an annular surgical junction with a junction diameter and a region of traumatized tissue extending radially outward from the surgical junction, the contact lens comprising:

a lens body formed of a rigid gas permeable material having an anterior surface adapted to face away from the post-surgical cornea, a posterior surface adapted to face toward the post-surgical cornea, and an overall diameter within the range from about 119% to about 130% of the value of the junction diameter;

the posterior surface having a circular optical zone disposed in its center spanning the surgical junction, and annular secondary zone coupled to the optical zone and extending radially therefrom across the region of traumatized tissue, and an annular peripheral zone coupled to the secondary zone and extending radially therefrom;

the optical zone having a diameter within the range from about 96% to about 111% of the value of the junction diameter and having a spherical, rearwardly concave curvature with a constant radius of curvature;

the secondary zone having a radial width on each side of the optical zone within the range from about 2.5% to about 3.8% of the value of the junction diameter and having an aspheric, rearwardly concave curvature with a radius of curvature that varies continuously as it transitions between the optical zone and the peripheral zone; and the peripheral zone having a redial width on each side of the secondary zone within the range from about 3.8% to about 6.3% of the value of the junction diameter and having a spherical, rearwardly concave curvature with a constant radius of curvature;

wherein, when the lens is positioned on the post-surgical cornea such that the peripheral zone is disposed radially outside the surgical junction, the peripheral zone will adhere to the cornea with a relatively thin tear film while a relatively thick tear film will be trapped between the optical zone and the cornea.

14. A RGP contact lens in accordance with claim 13 wherein:

the spherical, rearwardly concave curvature of the optical zone has a constant radius of curvature within the range from about 91% to about 103% of the value of the junction diameter;

the aspheric, rearwardly concave curvature of the secondary zone has a continuously variable radius of curvature having a value that varies from about 25% to about 44% of the value of the junction diameter; and the spherical, rearwardly concave curvature of the peripheral zone has a constant radius of curvature within the range from about 138% to about 163% of the value of the junction diameter.

15. A RGP contact lens in accordance with claim 13, wherein the overall diameter of the lens is within the range from about 125% to about 128% of the value of the junction diameter.

16. A RGP contact lens in accordance with claim 15, wherein:

the optical zone has a diameter within the range from about 106% to about 109% of the value of the junction diameter;

the secondary zone having a radial width on each side of the optical zone within the range from about 3.1% to about 3.8% of the value of the junction diameter; and the peripheral zone having a radial width on each side of the secondary zone within the range from about 3.8% to about 6.3% of the value of the junction diameter.

* * * * *